(12) United States Patent
Parker (10) Patent No.: US 9,616,989 B2
(45) Date of Patent: Apr. 11, 2017

(54) BEARING BLOCK FOR A SLAT SUPPORT ASSEMBLY

(71) Applicant: Airbus Operations Limited, Bristol (GB)

(72) Inventor: Simon Parker, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/688,488

(22) Filed: Apr. 16, 2015

(65) Prior Publication Data
US 2015/0298795 A1    Oct. 22, 2015

(30) Foreign Application Priority Data

Apr. 17, 2014    (GB) .................................. 1406988.4

(51) Int. Cl.
*B64C 3/50*        (2006.01)
*B64C 9/02*        (2006.01)

(52) U.S. Cl.
CPC ...................... *B64C 9/02* (2013.01)

(58) Field of Classification Search
CPC .. B64C 9/02; B64C 9/22; B64C 13/28; B64C 13/34; F16C 11/02; F16C 29/045; F16C 17/02; F16C 23/02
USPC ........................................................ 244/214
See application file for complete search history.

(56) References Cited

U.S. PATENT DOCUMENTS

| | | | | |
|---|---|---|---|---|
| 1,376,310 A | * | 4/1921 | Armstrong | F16C 23/086 384/571 |
| 2,767,037 A | * | 10/1956 | Williams | F16C 23/086 384/482 |
| 5,441,351 A | * | 8/1995 | Grunze | F16C 23/086 384/450 |
| 2011/0031351 A1 | * | 2/2011 | Wildman | B64C 9/16 244/131 |
| 2011/0168849 A1 | * | 7/2011 | Parker | B64C 9/02 244/214 |

(Continued)

FOREIGN PATENT DOCUMENTS

| | | |
|---|---|---|
| EP | 2284077 A2 | 2/2011 |
| WO | 2010/026410 A2 | 3/2010 |

OTHER PUBLICATIONS

UKIPO Search Report dated Oct. 24, 2014, in Great Britain Application No. 1406988.4.

*Primary Examiner* — Richard G Davis
(74) *Attorney, Agent, or Firm* — Hauptman Ham, LLP (57) ABSTRACT

A bearing block to support and guide movement of a slat support arm forming part of a slat support assembly in which the slat support arm is movable to deploy a slat attached to one end of said slat support arm from a leading edge of an aircraft wing is disclosed. The bearing block comprises a plurality of bearings mountable therein so as to lie in rolling contact with an associated bearing track on a slat support arm extending through the bearing block. Each bearing comprises a bearing element rotatable about a shaft fixed to the bearing block an and is configured so that an axis of rotation of each bearing element angularly adjusts, relative to an axis of the shaft on which it is rotatably mounted, to compensate for misalignment between said shaft and an associated bearing track. A slat support assembly and an aircraft wing is also disclosed.

15 Claims, 8 Drawing Sheets

(56) References Cited

U.S. PATENT DOCUMENTS

| | | | | |
|---|---|---|---|---|
| 2011/0182539 A1* | 7/2011 | Kolar | ............ | F16C 23/086 |
| | | | | 384/488 |
| 2011/0220762 A1* | 9/2011 | Gyuricsko | ............ | B64C 9/22 |
| | | | | 244/99.3 |
| 2011/0253832 A1* | 10/2011 | Wildman | ............ | B64C 9/02 |
| | | | | 244/99.13 |
| 2013/0108200 A1* | 5/2013 | Berns | ............ | F16C 33/7806 |
| | | | | 384/477 |
| 2014/0061381 A1* | 3/2014 | Gyuricsko | ............ | B64C 9/22 |
| | | | | 244/99.3 |
| 2015/0226267 A1* | 8/2015 | Dellupi | ............ | F16C 39/02 |
| | | | | 384/50 |
| 2015/0292561 A1* | 10/2015 | McNeil | ............ | F16C 21/00 |
| | | | | 244/213 |
| 2016/0083081 A1* | 3/2016 | Cowles, Jr. | ............ | B64C 9/02 |
| | | | | 244/99.3 |

* cited by examiner

BEARING BLOCK FOR A SLAT SUPPORT ASSEMBLY

CROSS-REFERENCE TO RELATED APPLICATIONS

This application claims the benefit of Great Britain Application No. 1406988.4, filed Apr. 17, 2014, which is incorporated herein by reference in its entirety.

INTRODUCTION

The present invention relates to a bearing block to support and guide movement of a slat support arm forming part of a slat support assembly in which the slat support arm is movable to deploy a slat attached to one end of said slat support arm from a leading edge of an aircraft wing. A slat support assembly comprising the bearing block is also disclosed, together with an aircraft wing comprising the slat support assembly of the invention and a method of mounting a slat support arm between adjacent spaced parallel ribs of an aircraft wing so that the slat support arm is movable to deploy a slat attached to one end of said slat support arm from a leading edge of said wing.

BACKGROUND

Aircraft need to produce varying levels of lift for take-off, landing and cruise. A combination of wing leading and trailing edge devices are used to control the wing coefficient of lift. The leading edge device is known as a slat. On larger aircraft there may be several slats spaced along the wing edge. During normal flight the slats are retracted against the leading edge of the wing. However, during take-off and landing they are deployed forwardly of the wing so as to vary the airflow across and under the wing surfaces. The slats usually follow an arcuate or curved path between their stowed and deployed positions. By varying the extent to which the slat is deployed along said path, the lift provided by the wing can be controlled.

Figure 1:
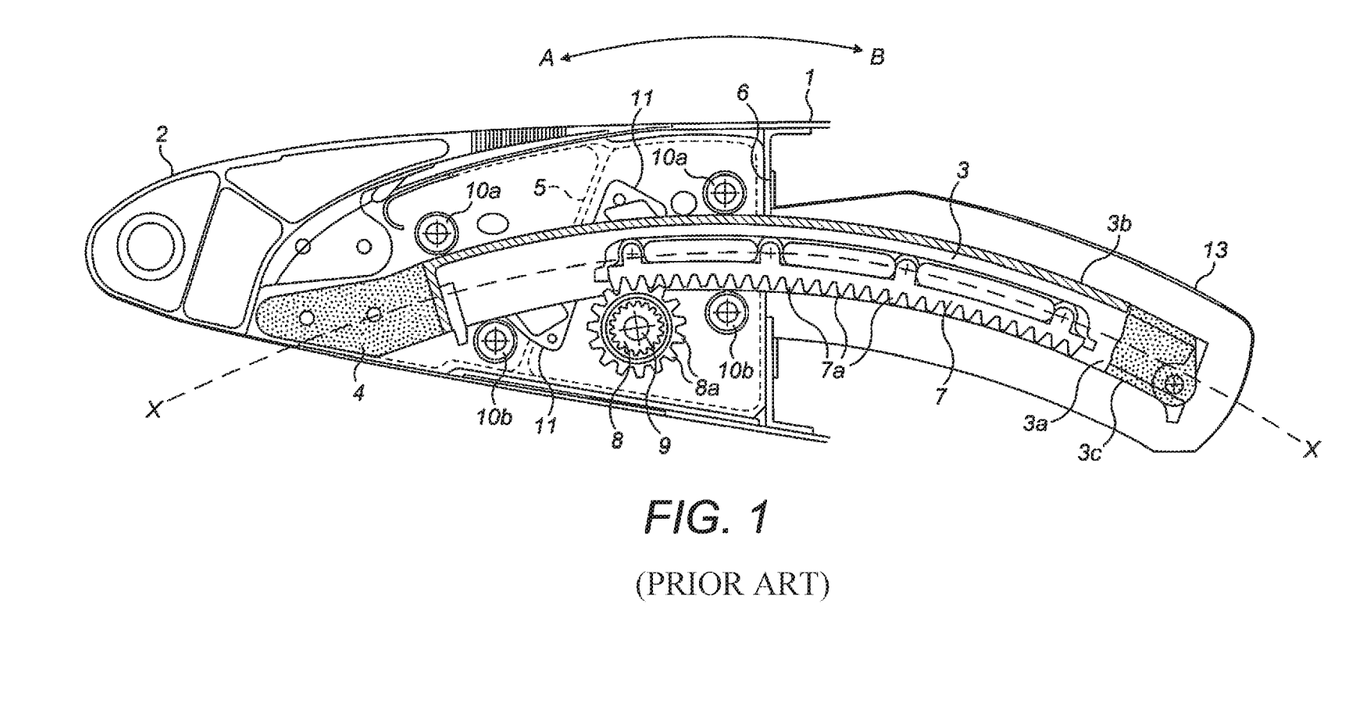
FIG. 1 is a prior art side-sectional view through a portion of a leading edge of a wing of an aircraft with a slat shown in its stowed position.

An assembly is required to support and guide movement of a slat between stowed and deployed positions and a typical arrangement showing a cross-section through part of a wing 1 and a slat 2 in its stowed position is illustrated in FIG. 1. As can be seen from FIG. 1, the slat 2 has an arcuate support arm or slat track 3, one end 4 of which is rigidly attached to the rear of the slat 2 and extends into the wing 1.

The slat track 3 penetrates machined rib 5 and wing spar 6 forming the wing structure. The slat track 3 defines an arc having an axis and is mounted within the wing so that it can rotate about that axis (in the direction indicated by arrows "A" and "B" in FIG. 1) to deploy and retract the slat 2 attached to one end of the slat track 3.

To drive the slat rack 3 so as to deploy or retract the slat 2, a toothed slat rack 7 having an arcuate shape corresponding to the arcuate shape of the slat track 3 is mounted within a recess 3a on the slat track 3 and a correspondingly toothed drive pinion 8 is in engagement with the teeth 7a on the slat rack 7 so that when the drive pinion 8 rotates, the teeth 8a on the drive pinion 8 and the teeth 7a on the rack 7 cooperate to pivot or drive the slat rack 7 and the slat attached thereto, into a deployed position, i.e. in the direction of arrow "A" in FIG. 1. Typically, the slat track 3 rotates through an angle of 27 degrees between its fully stowed and fully deployed positions. Rotation of the pinion 8 in the opposite direction also drives the slat track 3, in the direction of arrow "B", back into its stowed position, as shown in FIG. 1.

The drive pinion 8 is mounted on a shaft 9 that extends along, and within, the leading edge of the wing 1. Several gears 8 may be rotatably mounted on the shaft 8, one for driving each slat 2 so that when the shaft 9 is rotated by a slat deployment motor close to the inboard end of the wing 1, the slats are all deployed together.

The slat track 3 has a generally square cross-sectional profile such that its upper and lower surfaces 3b, 3c each define a portion of a curved surface of a cylinder each having its axis coaxial with the axis of rotation of the slat track 3. The slat track 3 has an arcuate mid-line, indicated by X-X in FIG. 1, that extends through the centre of the slat track 3 parallel to and equally spaced from each of its upper and lower surfaces 3b, 3c which defines the path along which the slat track 3 travels.

The slat track 3 is supported between roller bearings 10a, 10b both above and below the slat track 3 and the axis of rotation of each bearing 10a, 10b is parallel to the axis of rotation of each of the other bearings 10a, 10b and to the axis about which the slat track 3 rotates in the direction of arrows "A" and "B" between its stowed and deployed positions. The upper bearings 10a lie in contact with an upper bearing track 3b of the slat track 3 and the lower bearings 10b lie in contact with a lower bearing track 3c so that they support the slat track 3 and guide it during deployment and retraction. The bearings 10a, 10b resist vertical loads applied to the slat 2 during flight both in stowed and deployed positions and also guide movement of the slat track 2 during slat deployment and retraction.

It will be appreciated that the bearings 10a, 10b resist loads that are applied in the vertical direction only. By vertical loads are meant loads that act in a direction extending in the plane of the drawing or, in the direction that acts at right-angles to the axis of rotation of each bearing.

It will be appreciated that there can be significant side loads acting on a slat 2 in addition to loads acting in a vertical direction during flight, especially as the slats 2 generally do not extend along the leading edge of the wing 1 exactly square to the direction of airflow. By side-loads is meant loads that act in a direction other than in a direction that extends in the plane of the drawing or, in other words, those loads that act in a direction other than at right-angles to the rotational axis of each bearing 10a, 10b.

To counteract side-loads, it is common to support the slat track 3 by further bearings 11 disposed on either side of the slat track 3 as opposed to the vertical load bearings 10 mounted above and below the slat track 3. These side-load bearings 11 may not be rotational and may just comprise bearing surfaces, pads or cushions against which the side walls of the slat track 3 may bear when side loads are applied to the slat 2.

It will be appreciated that space for components within the wing structure close to the leading edge of the wing 1 is very limited, especially once the slat track 3 together with its vertical and side load bearings 10a, 10b, 11, and the drive pinion 8 have all been installed. The requirement to house all these components places considerable design restrictions on the shape of the wing 1 in addition to increasing weight, manufacturing costs and complexities.

As the additional side-load bearings 11 are disposed between each of the upper and lower bearings 10a, 10b, these bearings must be spaced from each other in the circumferential direction about the axis of the slat track 3 by a distance which provides sufficient space between the bearings 10a, 10b to receive the side-load bearings 10a, 10b.

As a consequence of this, a further disadvantage with the conventional assembly is that the slat track 3 must be relatively long to accommodate the desired maximum deployment angle for the slat 2 whilst ensuring that the slat track 3 is adequately supported by two vertical load bearings 10a above the slat track 3 and two vertical load bearings 10b below the slat track 3, even at maximum deployment. As a result of its extended length, the slat track 3 penetrates the spar 6 and so the free end of the slat track 3 must be received within a track can 13 to separate the slat track 3 from the fuel stored within the wing 1 behind the spar 6. However, it is undesirable to have openings in the spar 6. It will also be appreciated that the requirement for a track can 13 also presents additional problems and assembly issues with the need to provide an adequate seal where the track can 13 is attached to the spar 6.

The Applicant has developed a slat support assembly that substantially overcomes or alleviates the issues identified above and which is described in detail in WO2010/026410, which is incorporated herein in its entirety.

WO2010/026410 discloses a slat support assembly in which at least some of the bearing tracks of the slat support arm and the associated bearings are configured so that each bearing counteracts load applied to the slat support arm in more than one direction. More specifically, the slat support arm may have a pair of adjacent upper bearing surfaces which are arranged at an angle relative to each other so that a bearing associated with one upper bearing track on the slat support arm does not share a common axis with the bearing associated with the other upper bearing track on the slat support arm. Furthermore, the slat support arm may have a pair of adjacent lower bearing tracks that are arranged at an angle relative to each other so that a bearing associated with one lower bearing track does not share a common axis with the bearing associated with the other lower bearing track. Alternatively, the lower bearings may be arranged with their axes coaxial so it is only the upper bearings whose axes are angled relative to each other.

For convenience and ease of assembly, the bearings are mounted in one or more bearing blocks each of which are attachable between ribs of the aircraft wing to retain the bearing block in position. Each bearing block is provided with an opening through which the slat support arm passes, together with four cavities that surround the opening each of which receives and mounts a bearing within the block so that each bearing has its bearing surface in rolling contact with its associated bearing track on the slat support arm that extends through the opening.

The above-described arrangement provides an assembly in which each of the bearings is able to withstand loads applied to the slat support arm in multiple directions, so additional side-load bearings or cushions are no longer required.

Thus, more space is provided within the leading edge of the wing that enables bearings to be positioned closer together in the deployment direction and allowing a shorter slat support arm to be used than is usual.

Whilst the slat support assembly known from WO2010/026410 offers a number of advantages, the present invention seeks to provide modifications that enable a degree of adjustment during assembly of the slat support assembly to compensate for, for example, manufacturing tolerances and/or to enable a pre-load to be applied between the track and the bearings.

SUMMARY OF THE INVENTION

According to the invention, there is provided a bearing block to support and guide movement of a slat support arm forming part of a slat support assembly in which the slat support arm is movable to deploy a slat attached to one end of said slat support arm from a leading edge of an aircraft wing, the bearing block comprising a plurality of bearings mountable therein so as to lie in rolling contact with an associated bearing track on a slat support arm extending through the bearing block, wherein each bearing comprises a bearing element rotatable about a shaft fixed to the bearing block, each bearing being configured so that an axis of rotation of each bearing element angularly adjusts, relative to an axis of the shaft on which it is rotatably mounted, to compensate for misalignment between said shaft and an associated bearing track.

In a preferred embodiment, a spherical or self-aligning bearing member mounts each bearing element to its associated shaft.

The bearing block preferably comprises a pair of spaced end walls and is configured so that, when it is received between spaced ribs forming a structural part of an aircraft wing, an end wall is positioned so that it faces a surface of a respective rib.

Each end wall may have an arcuately shaped shoulder for cooperation with a corresponding engagement surface on said rib such that the bearing block is rotatable about a central axis extending through the bearing block perpendicular to the ribs, with the arcuately shaped shoulder sliding against said corresponding engagement surface.

In a preferred embodiment, an adjustment and clamping member is provided to enable rotation of said bearing block about said central axis and to clamp said bearing block in position after rotation.

The adjustment and clamping member may comprise a body positionable on a side of a rib opposite to the side facing the bearing block, and legs that extend from the body and pass through arcuately-shaped slots in the rib to locate in holes in the end wall of the bearing block. The legs may be slidable within the slots so that the bearing block rotates about said central axis in response to rotation of the body.

Preferably, the body is spaced from said rib by said legs and the legs are slidable in an axial direction into the bearing block, after an angular position has been reached, to clamp the adjustment and clamping member to the rib and prevent further movement of the bearing block.

The body may comprise cooperating elements for engagement with corresponding cooperating elements on the rib when the body is slid in an axial direction towards the bearing block to prevent further movement of the bearing block.

In some embodiments, the cooperating elements on the body comprise a serrated or toothed ring which is received within an aperture in the rib when the body is slid in an axial direction, to cooperate with corresponding serrations or teeth around the periphery of said aperture in the rib.

According to another aspect of the invention, there is provided a slat support assembly comprising a slat support arm and at least one bearing block according to the invention, the slat support arm having a plurality of bearing tracks extending along its length and being supported by, and movable within, said at least one bearing block to deploy a slat attached to one end of said slat support arm from a leading edge of an aircraft wing.

At least some of the bearings are preferably configured so that each bearing counteracts load applied to the slat support arm in more than one direction.

According to another aspect of the invention, there is provided a wing for an aircraft comprising a slat support assembly according to the invention, and a pair of parallel ribs forming part of the structure of said wing spaced from each other with the or each bearing block extending between said ribs.

Each rib preferably comprises a recess or seat to receive a respective end wall of the bearing block extending between the ribs. The recess or seat in each rib may be shaped to allow rotation of the bearing block about a central axis of said bearing block within said recess or seat.

In some embodiments, the recess or seat may extend to an edge of each rib to enable insertion of the bearing block into the seat or recess between said ribs in a direction perpendicular to the plane of each rib.

According to another aspect of the invention, there is provided a method of mounting a slat support arm between adjacent spaced parallel ribs of an aircraft wing so that the slat support arm is movable to deploy a slat attached to one end of said slat support arm from a leading edge of said wing, the method including the steps of:
(a) mounting a bearing block having a plurality of bearings received therein so that it extends between adjacent spaced parallel ribs;
(b) inserting a slat support arm into the bearing block so that each bearing in the bearing block lies in rolling contact with an associated bearing track on the slat support arm to support and guide movement of the slat support arm relative to the bearing block in a plane parallel to said ribs between which said bearing block is mounted,
(c) pivoting the bearing block about a central axis of the bearing block that extends perpendicular to said plane into a tilted position; and
(d) locking the bearing block in said tilted position.

If each rib includes a recess step (a) may include the step of positioning the bearing block so that its end walls are received within a respective recess in each rib. The recess may extend to an edge of each rib so that a bearing block may be slid into the recesses between said ribs.

DESCRIPTION OF THE DRAWINGS

Embodiments of the invention will now be described, by way of example only, and with reference to FIGS. 2 to 10 of the accompanying drawings, in which.

DESCRIPTION OF THE PREFERRED EMBODIMENTS

Referring to FIGS. 2 to 11 of the accompanying drawings, there is shown a slat support arm 15 forming part of a slat support assembly according to an embodiment of the present invention and which has a pair of upper bearing tracks 16a, 16b, and a pair of lower bearing tracks 17a,17b. Each of the upper bearing tracks 16a, 16b are not co-planar but are angled relative to each other, as are each of the lower bearing tracks 17a, 17b. However, it will be appreciated that only the upper 16a, 16b or the lower bearing tracks 17a, 17b may be angled relative to each other, as required. If only the upper bearing tracks 16a, 16b are angled relative to each other, the lower bearing tracks 17a, 17b may lie in the same plane. A slat rack 18 is received in a groove 19 in the slat support arm 15 and has teeth 20 for engagement with a drive pinion (not shown), similar to the arrangement described with reference to FIG. 1.

Figure 2:
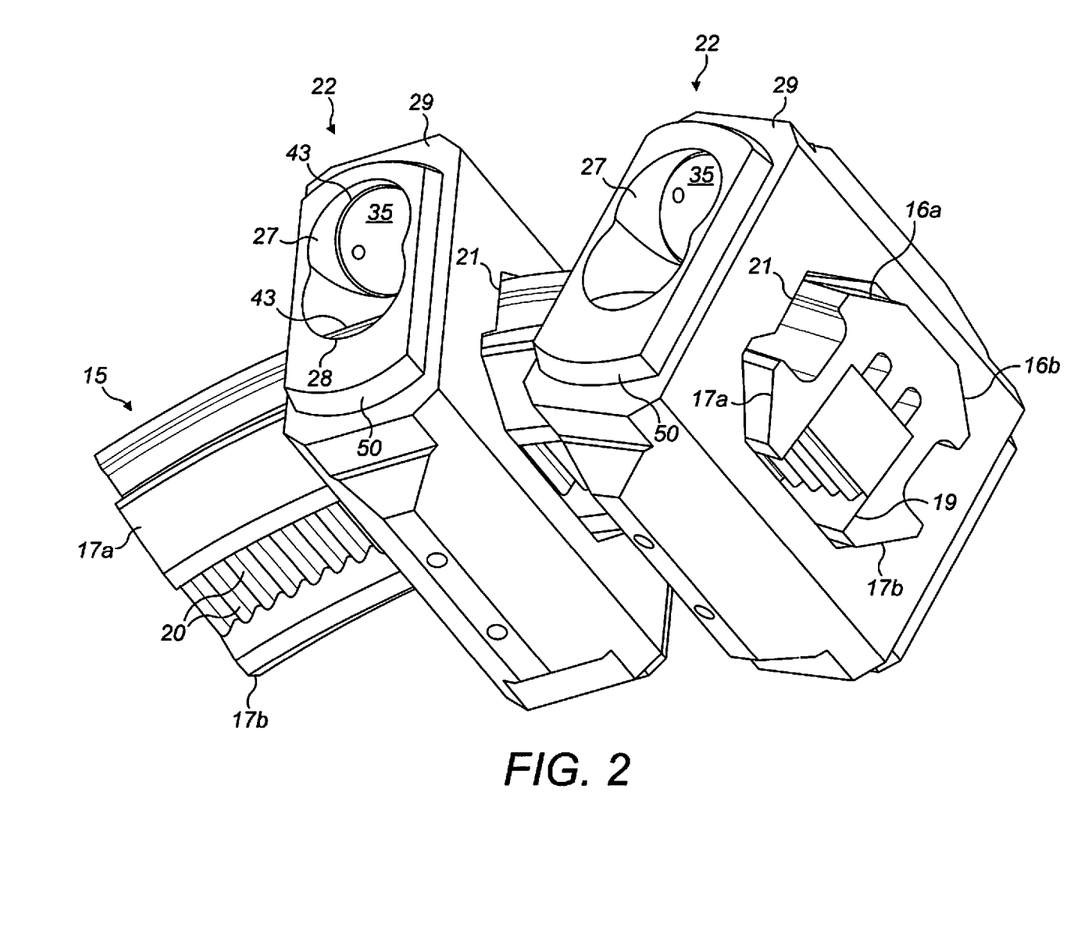
FIG. 2 is a perspective view of part of a slat support arm extending through two bearing blocks according to an embodiment of the present invention.

The slat support arm 15 extends through an opening 21 in each of a pair of bearing blocks 22 which are spaced from each other in the direction of travel of the slat support arm 15 between its deployed and retracted positions along an arcuate path defined by the mid-line X-X extending through the slat support arm 15 as shown in FIG. 2. Each bearing block 22 mounts and holds a set of four bearings 23,24,25,26 (see FIG. 3), each having bearing surfaces that lie in contact with an associated bearing track 16a, 16b, 17a, 17b on the slat support arm 15. Each set of bearings 23,24,25,26 includes a pair of upper support bearings 23, 24 and a pair of lower support bearings 25, 26. Each bearing block 22 has recesses 27, accessible via openings 28 in opposing end walls 29 of each bearing block 22, to facilitate insertion of the bearings 23,24,25,26 into the bearing block 22 and their removal therefrom.

Figure 3:
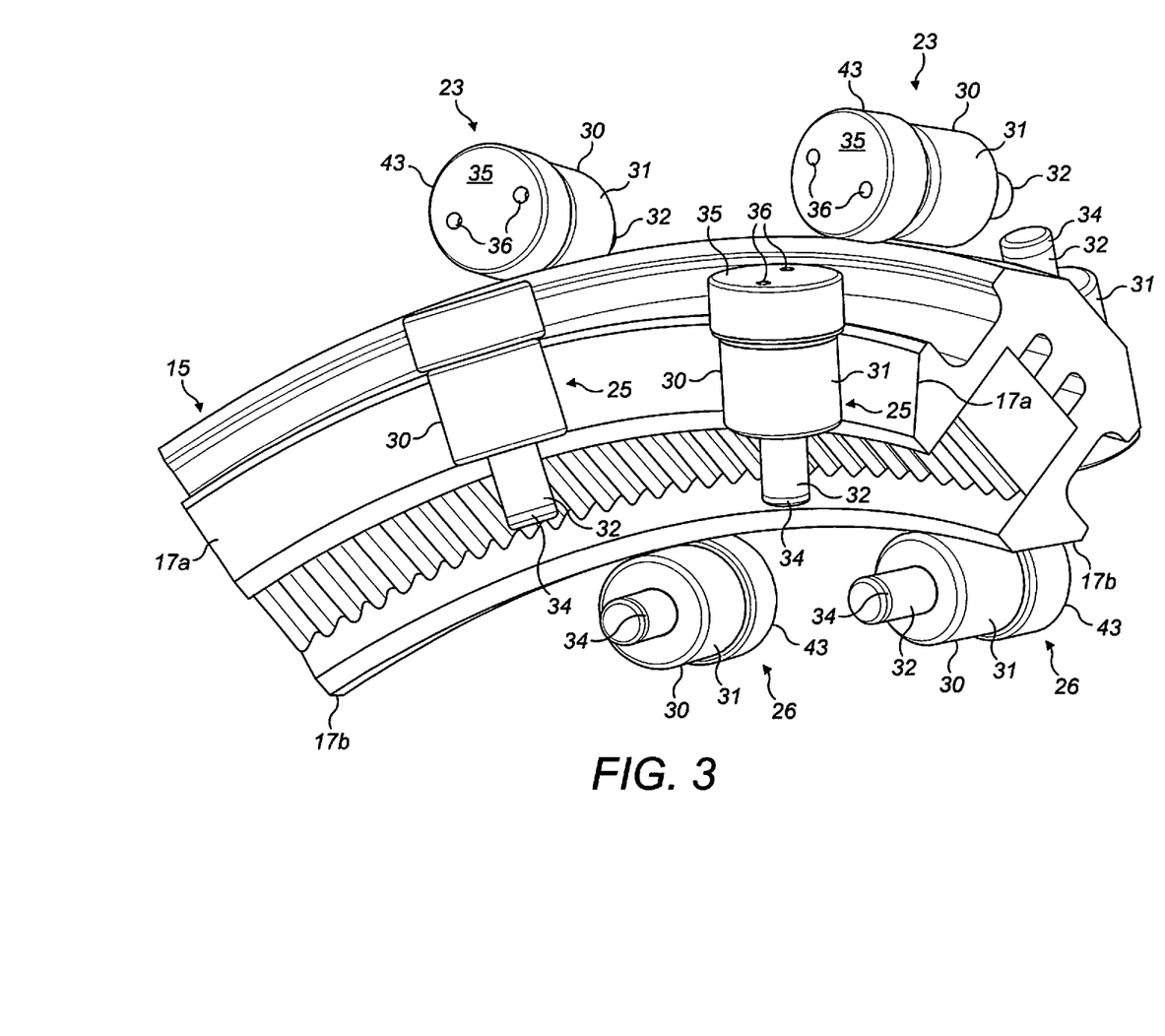
FIG. 3 is a perspective view similar to that of FIG. 1, but with the bearing blocks removed for clarity and so that the bearings are visible.

The bearings 23,24,25,26 can be seen more clearly from FIG. 3, which is identical to FIG. 1 except that the bearing blocks 22 have been omitted so that the bearings 23,24,25,26 and their positions relative to the slat support arm 15 are more clearly visible. Each bearing 23,24,25,26 comprises a cylindrical bearing element 30 having a curved outer peripheral bearing surface 31 that is mounted on a shaft 32 having an end cap or head portion 33. The end of the shaft 32 remote from the cap 33 is part-threaded at 34 for threaded engagement with a corresponding thread (not shown) in the recess 27 in the bearing block 22 when the shaft 32, together with the bearing element 30 mounted thereon, is inserted into their recess 27 through the openings 28 in the end walls 29 of each bearing block 22. The upper end face 35 of the cap 33 has holes 36 to cooperate with a tool (not shown) to enable the bearing 23,24,25,26 to be located within and tightened within the bearing block 22.

Each bearing element 30 is cylindrical and has a longitudinal axis A-A. Each bearing element 30 is freely mounted for rotation about its fixed shaft 32, which has a longitudinal axis B-B. Whilst the axis A-A of the bearing element 30 and the axis B-B of the shaft 32 may be coaxial with each other, as shown in FIG. 3, the bearing element 30 is mounted to its shaft 32 via a self-aligning or spherical bearing member 37 (see FIG. 8), so that the bearing element 30 has a limited freedom of movement in all directions relative to its shaft 32 and can tolerate a small angular misalignment with its associated shaft 32. Therefore, the axis A-A of the bearing element 30 may lie at an angle relative to the axis B-B of the shaft 30. This freedom of movement of the bearing element 30 relative to the shaft 32 to which it is mounted provides the bearing elements 30 we a degree of adjustability in their position so that each bearing 23,24,25,26 self-aligns and maintains a full and accurate line of contact with its corresponding bearing track 16a,16b, 17a,17b across its full width, irrespective of whether the bearing block 22 has been tilted out of its neutral position to compensate for any misalignment, deflections or improper mounting or, to enable the bearings 23,24,25,26 to be pre-loaded against the bearing track 16a,16b,17a,17b, as will now be explained in more detail below.

Figure 4:
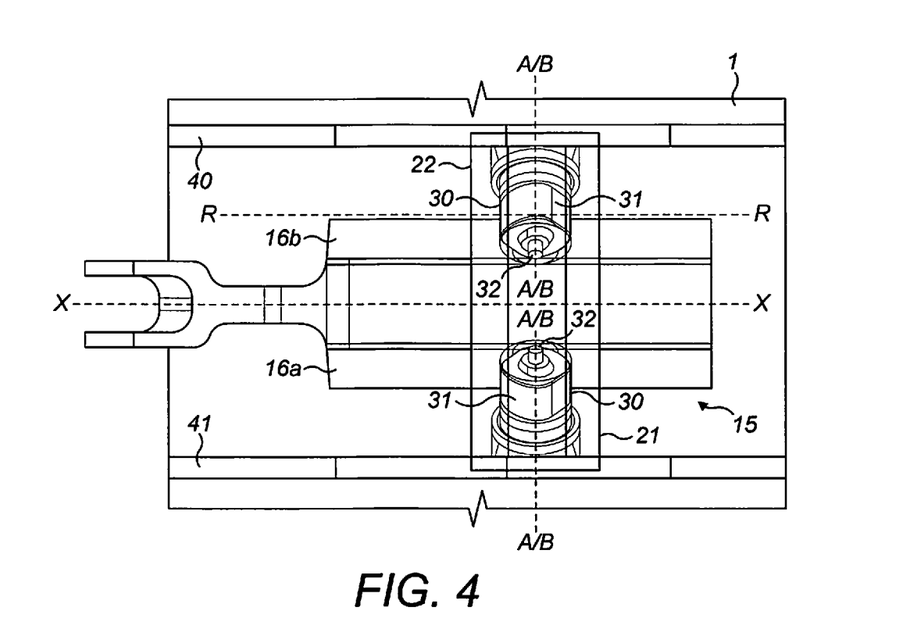
FIG. 4 shows a plan view of part of a slat support arm supported on bearings received in a bearing block mounted between spaced structural ribs of an aircraft wing, with the bearing block in a neutral, non-angled, position.

FIG. 4 is a plan view of part of a slat track 15 extending through a single bearing block 22. The upper bearings 16a, 16b mounted in the bearing block 22 are also shown for clarity although they would be hidden within the bearing block 22 and so would not be visible in practice. During assembly, the bearing block 22 is received between spaced ribs 40, 41 forming part of the structure of the aircraft wing 1 (which is shown in part in FIGS. 4 and 5 and in full in FIG. 11), and is immovably fixed in position, as will become apparent from the description that follows. In FIG. 4, the bearing block 22 is shown in a 'neutral' or upright position in which the axis B-B of each bearing shaft 32 lies at right-angles to the direction of travel of the slat support arm 15 through the opening 21 in the bearing block 22, as indicated by line R-R, and the axis of rotation A-A of each bearing element 30 is coaxial with the axis of rotation B-B of its associated bearing shaft 32. In this position, there is no compensation for manufacturing tolerances and no pre-loading of the bearings against the bearing track 16a, 16b.

Figure 5:
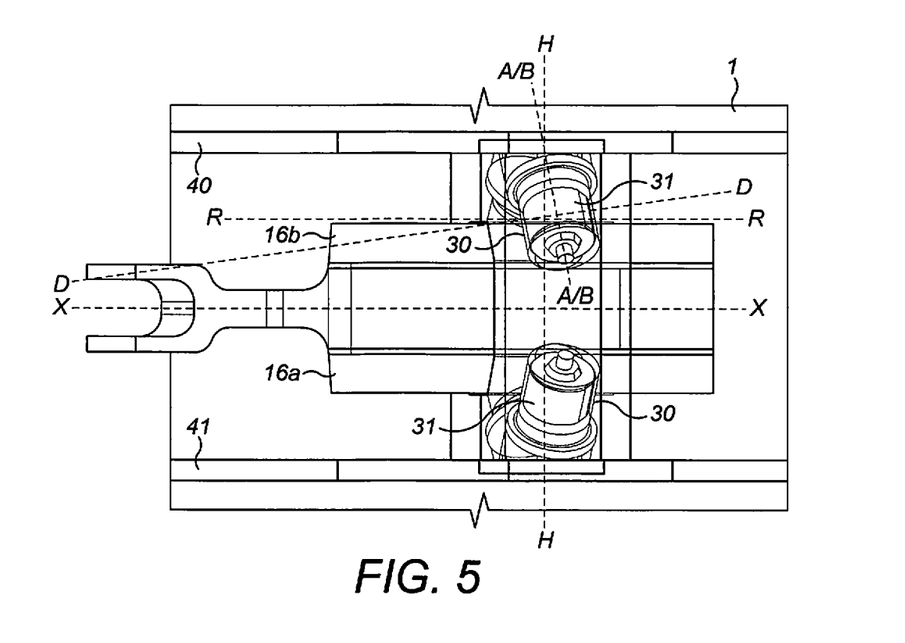
FIG. 5 shows a plan view similar to FIG. 4 but with the bearing block tilted through an angle of 12 degrees to compensate for misalignment or for pre-loading.

FIG. 5 is similar to FIG. 4, except that the bearing block 22 has now been tilted about an axis H-H, which extends through a centre of the bearing block 22 at right angles to the ribs 40, 41 and which intersects the arcuate mid-line X-X extending through the centre of the slat support arm 15 along which the slat support arm 15 moves. In FIG. 5, the angle of inclination of the bearing block is shown as being in the order of 12 degrees, although other angles in excess of, or lower than, 12 degrees may also be employed. It will also be appreciated that the bearing block 22 can be tilted about axis H-H in either direction.

Despite the bearing block 22 being tilted out of its neutral position shown in FIG. 4, FIG. 5 still shows the bearing elements 30 in their original positions in which the axis of rotation A-A of each bearing element 30 is still coaxial with the axis of rotation B-B of its associated bearing shaft 32, so as to illustrate the misalignment that occurs between the bearing surface 31 of the bearing element 30 and the bearing track 16a,16b on the slat support arm 15 when the bearing block 22 is tilted as shown in FIG. 5. It will be appreciated that the axis of rotation A-A of the bearing elements 30 and the axis of rotation B-B of the shaft 32 lie at a right angle to line D-D, whereas the bearing elements 30 need to be rotating about an axis that lies at right angles to line R-R to maintain alignment and a full line of contact with the bearing track 16b, 16a.

Figure 6:
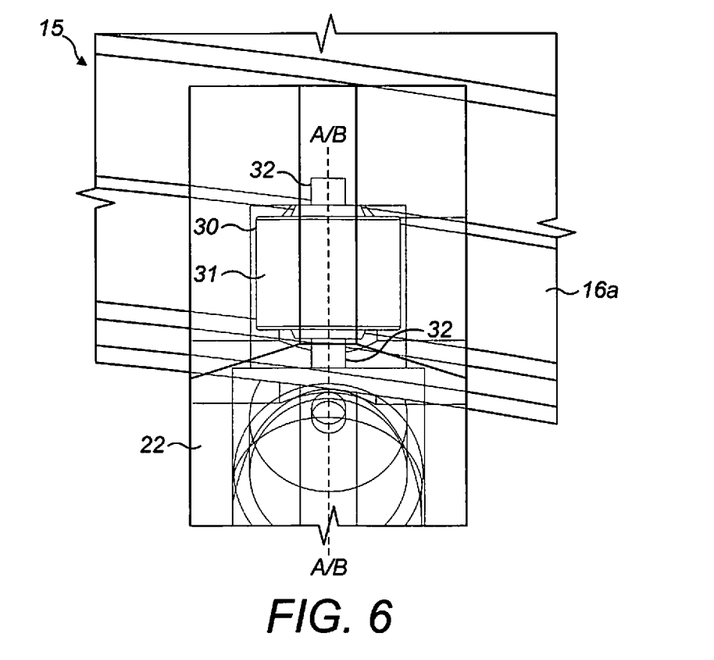
FIG. 6 is an enlarged view of part of FIG. 5 showing one bearing to illustrate the bearing misalignment with the track that occurs when the bearing block is tilted out of its neutral position shown in FIG. 5.

The misalignment referred to above is shown in greater detail in FIG. 6, which illustrates a single bearing element 30 whose axis of rotation A-A remains coaxial with the axis of rotation B-B of the shaft 32 on which it is mounted.

Figure 7:
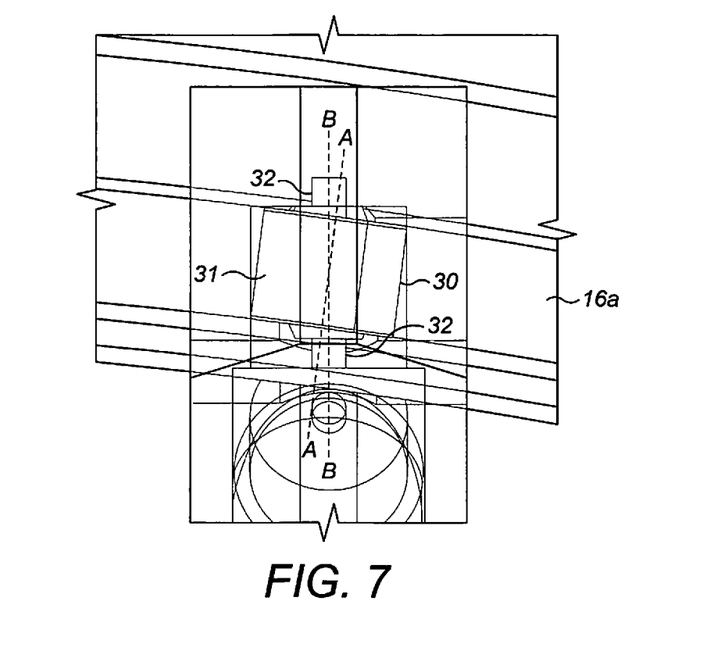
FIG. 7 is shows an embodiment of the present invention in which the conventional cylindrical roller bearings are replaced with self-aligning or spherical bearings to correct misalignment of the bearings with the track when the bearing block is tilted.
Figure 8:
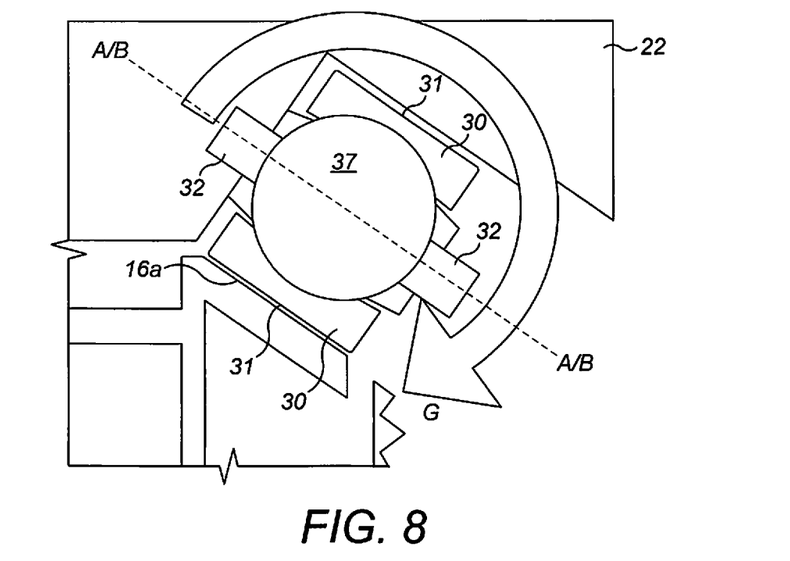
FIG. 8 shows a cross-sectional side elevation through the bearing of FIG. 7 to show a secondary direction of bearing adjustment provided by self-aligning or spherical bearings.

FIG. 7 is a similar view to FIG. 6, except that the bearing element 30 is now shown in a self-aligned position in which it has pivoted about arrow F upon tilting of the bearing block 22 into the position shown in FIG. 5, so that the axis A-A of the bearing element 30 is no longer coaxial with the axis B-B of the bearing shaft 32 and so that the bearing element 30 is now properly aligned with its associated bearing track 16a.

Whilst the bearing adjustment that is required is generally all in the same plane, i.e. in the plane occupied by arrow F in FIG. 7, there is also a small degree of adjustment required in a secondary plane at right angles to the plane occupied by arrow F. This is illustrated by arrow G in the cross-sectional side view through a bearing 30 shown in FIG. 8. Only approximately +/−2 degrees of bearing adjustment is generally required in this plane, whereas approximately +/−6.5 degrees of bearing adjustment is generally required in the plane occupied by arrow F in FIG. 7.

Figure 9:
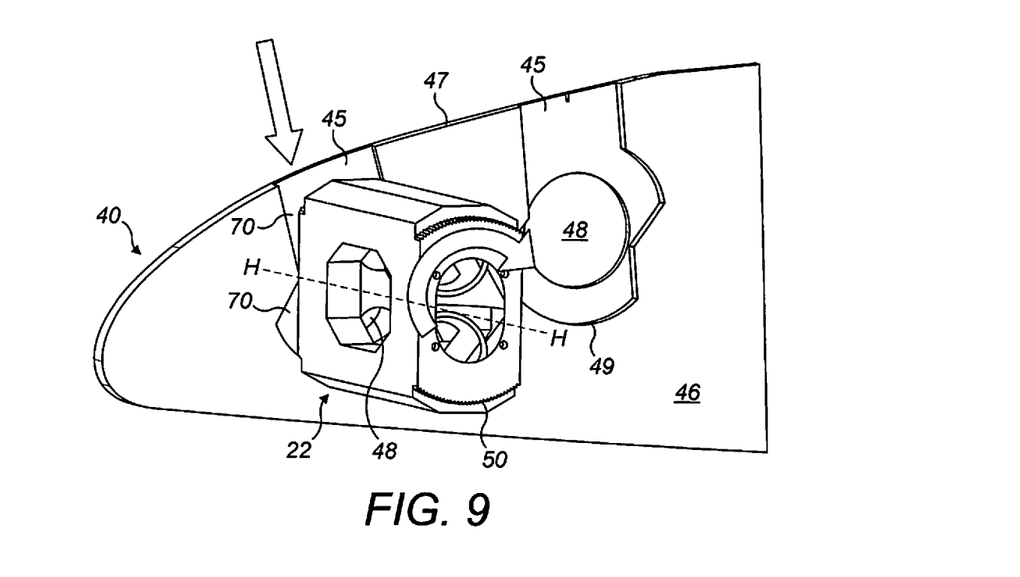
FIG. 9 is a perspective view of a bearing block and part of a rib of an aircraft wing to show how the bearing block may be tilted relative to the rib during assembly.

FIG. 9 is a perspective side view showing the bearing block 22 and one of the ribs 40 shown in FIG. 4, to illustrate how the bearing block 22 may be inserted between adjacent ribs 40, 41 and accurately positioned and angled or tilted to provide the required degree of tolerance compensation or pre-load, before being immovably fixed to the ribs 40, 41 during assembly.

As can be seen in FIG. 9, a machined relief or depression 45 is formed on the inner surface 46 of each rib 40, 41 that extends inwardly across the plane of the rib 40 from its upper edge 47. An aperture 48 is also formed in each rib 40, 41 within the area occupied by the depression 45. Two separate depressions 45 are shown in the rib 40 in FIG. 9, with a bearing block 22 positioned in only one of them. The end wall 29 of a second bearing block 22 would be received in the other depression 45 and the slat support arm 15 would extend through both bearing blocks 22, as shown in FIG. 2.

It will be understood that each bearing block 22 is inserted between the ribs 40,41 by engaging the opposing side walls 29 of the bearing block 22 with the ribs 40,41. The distance between adjacent ribs 40,41 and the width of the bearing block 22 is selected so that the bearing block 22 will be a snug or frictional fit between the ribs 40,41 with the side walls 29 received in the depression 45 in each rib 40,41. The bearing block 22 can be inserted into facing depressions 45 between ribs 40, 41 from the upper edge 47 of each rib 40, 41 where the depression 45 meets edge 47 (i.e. in the direction indicated by arrow 'Y' in FIG. 9), and slid home, i.e. until side walls 29 engage with a lower arcuately shaped edge or step 49 of the depression. The end walls 29 of the bearing block 22 are formed with arcuately shaped shoulders 50 that correspond with the arcuately shaped step 49 forming the lowermost edge of the depression 45 and the bearing block 22 is slid into the depression 45 between ribs 40, 41 until the shoulder 50 on each end wall 29 engages or contacts the step 49. In this position, the bearing block 22 is held loosely between the ribs 40, 41 and cannot drop further between them. Once in this position, the slat support arm 15 may be inserted through the openings 21 in each bearing block 22. The bearing block 22 may then be tilted about the centre line of the slat support arm 15 (i.e. about its central axis H-H in FIG. 9, which intersects mid-line X-X of the slat support arm 15), with the curved shoulder 50 sliding against the step 49. The depression 45 is formed with shaped cut out regions 70 to allow the bearing block 22 to pivot about its central axis H-H within the depression 45.

Once the optimum angular position for the bearing block 22 has been reached, it is necessary to lock the bearing block 22 in place so that it is no longer capable of moving. The locking or clamping mechanism should be capable of lasting the life of the aircraft and needs to enable the bearing block 22 to be positioned in an infinite number of locking positions within the desired angular range, whilst still allowing access to the bearing block 22 and bearings for inspection and maintenance. It should also be possible to release the clamping mechanism so that the bearing blocks 22 can be removed and replaced, without causing any damage to the surrounding structure or to the ribs 40, 41 to which the bearing blocks 22 are attached.

Figure 10A:
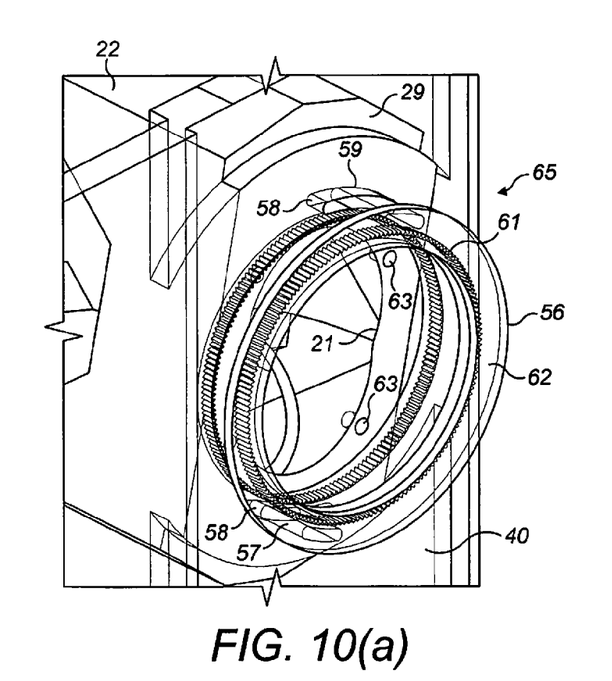
FIGS. 10a to 10c is a series of drawings to illustrate how the bearing block may be attached to a rib and tilted into its desired position before being clamped in place using a clamping ring.
Figure 10B:
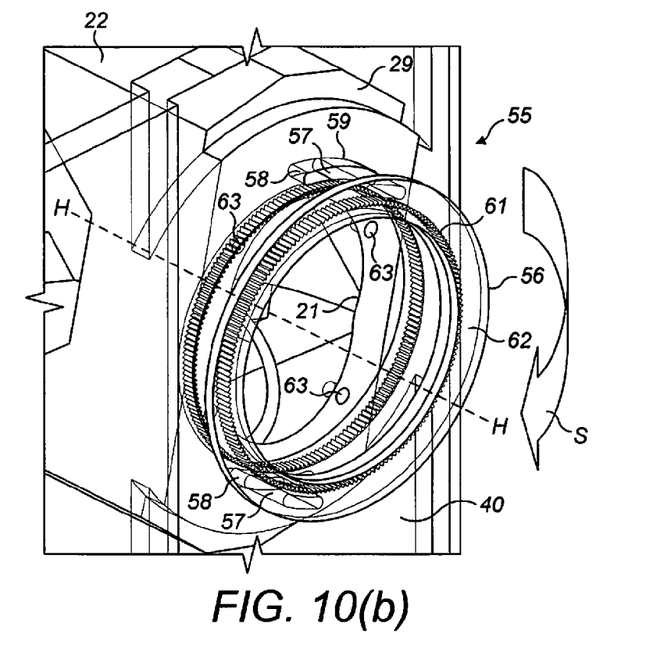

An appropriate adjustment and clamping mechanism 55 will now be described, with reference to FIGS. 10a to 10c. FIG. 10a shows a perspective view of one end wall 29 of a bearing block 22 received within a machined depression 45 in a rib 40 and in which the bearing block 22 has been rotated about axis A-A in order to counteract any misalignment or to preload the bearings against the bearing track 16a, 16b, 17a, 17b. Once the bearing block 22 has been inserted between the ribs 40, 41, an adjustment and clamping ring 56 is attached to the bearing block 22. The adjustment and clamping ring 56 has a pair of diametrically opposed arcuately shaped legs 57 each of which extend through, and are slideably received within, a corresponding arcuately shaped through slot 58 in the rib 40. The legs 57 are received in holes 59 in the end wall 29 of the bearing block 22. The legs 57 are retained in the holes 59 in the bearing block 22 under friction. As the adjustment and clamping ring 56 is rotated, such as in the direction of arrow S in FIG. 10b, the bearing block 22 also rotates together with the ring 56 into its desired angular position about axis H-H, with the legs 57 of the ring 56 sliding in their arcuate slots 58 in the rib 40.

Figure 10C:
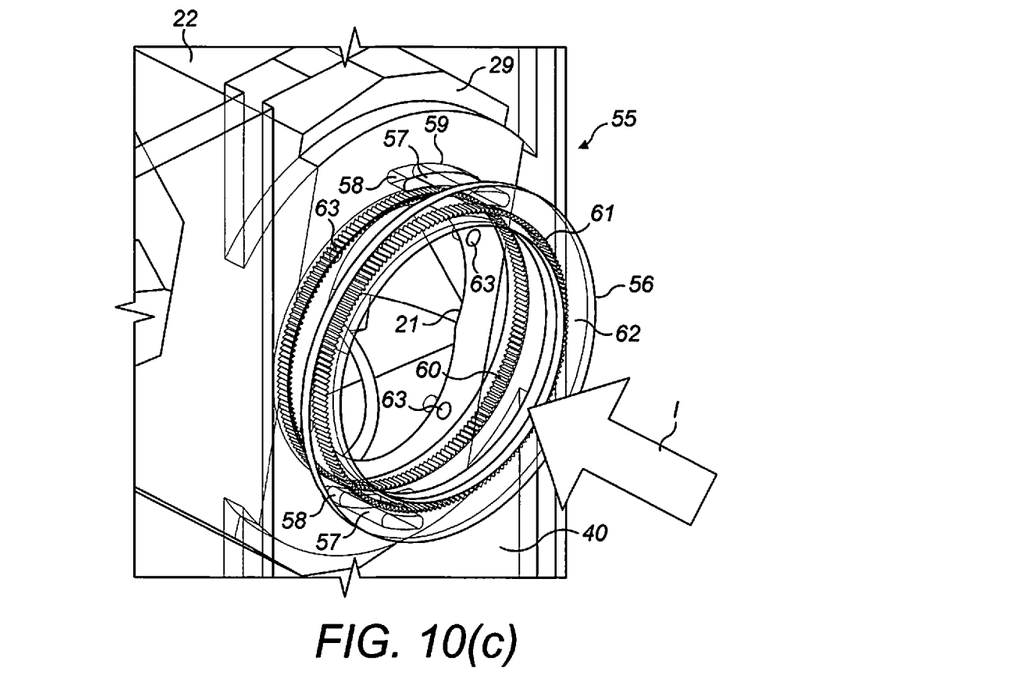
Figure 11:
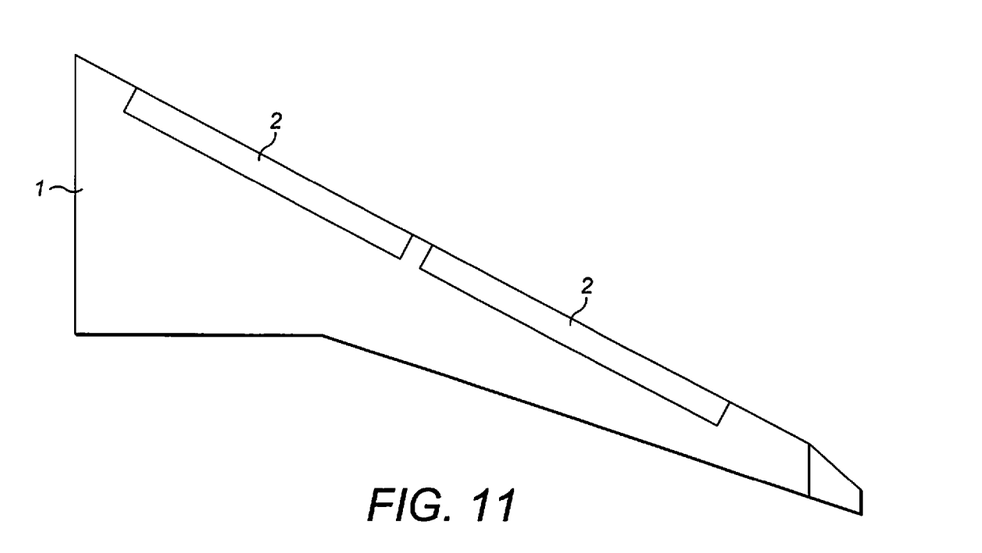
FIG. 11 is a plan view of a wing for an aircraft comprising slats deployable using the slat support assembly according to an embodiment of the invention.

Once the desired angular position of the bearing block 22 has been reached, the adjustment and clamping ring 56 is pushed inwardly, i.e. the direction of axis H-H and as shown by the arrow I in FIG. 10c. An inner peripheral surface of the opening 21 in the rib 40 is provided with serrations 60 or has a toothed profile and the adjustment and clamping ring 56 is similarly provided with corresponding serrations 61 or teeth that engage with the serrations or teeth 60 on the rib 40 when the ring 56 is moved inwardly along axis H-H.

It will be appreciated that the holes 59 in the end wall 29 of the bearing block 22 in which the legs 57 of the adjustment and clamping ring 56 are received are deep enough for the legs 57 to slide further into them as the adjustment and clamping ring 56 is pressed inwardly in the direction of arrow I. The adjustment and clamping ring 56 is pushed inwardly until a flange 62 on the ring 56 contacts the outer surface of the rib 40 in a region surrounding the opening 21 in the rib 40. In this position, the bearing block 22 is held in place due to engagement between the serrations 60, 61 or teeth on the rib 40 and on the ring 56. To further retain the ring 56 in position and prevent it from working loose, bolts or other fasteners (not shown) are inserted through holes in the flange 62 of the adjustment and clamping ring 56 and extend through the opening 48 in the rib 40 to threadingly engage in holes 63 in the end wall 29 of the bearing block 22. It will be appreciated that the clamping ring 56 can be easily removed to allow the position of a bearing block 22 to be further adjusted or to allow it to be removed and replaced.

As the bearing block 22 is tilted out of its neutral position, the bearing elements 30 adjust their axes A-A relative to the axis of their associated shafts B-B in order so that full-line contact between the bearing element 30 and its associated bearing track 16a, 16b, 17a, 17b is maintained and any required pre-load is applied.

It will be appreciated that the foregoing description is given by way of example only and that modifications may be made to the slat support assembly of the present invention without departing from the scope of the appended claims.

The invention claimed is:

1. A bearing block to support and guide movement of a slat support arm forming part of a slat support assembly in which the slat support arm is movable to deploy a slat attached to one end of said slat support arm from a leading edge of an aircraft wing, the bearing block comprising a plurality of bearings mountable therein so as to lie in rolling contact with an associated bearing track on a slat support arm extending through the bearing block, wherein each bearing comprises a bearing element rotatable about a shaft having an axis fixed to the bearing block, each bearing being configured so that an axis of rotation of each bearing element angularly adjusts, relative to said axis of the shaft on which it is rotatably mounted, to compensate for misalignment between said shaft and an associated bearing track.

2. A bearing block according to claim 1, comprising a spherical or self-aligning bearing member mounting each bearing element to its associated shaft.

3. A slat support assembly comprising a slat support arm and at least one bearing block according to claim 1, the slat support arm having a plurality of bearing tracks extending along its length and being supported by, and movable within, said at least one bearing block to deploy a slat attached to one end of said slat support arm from a leading edge of an aircraft wing.

4. A slat support assembly according to claim 3, wherein at least some of the bearings are configured so that each bearing counteracts load applied to the slat support arm in more than one direction.

5. A wing for an aircraft comprising a slat support assembly according to claim 3, and a pair of parallel ribs forming part of the structure of said wing spaced from each other with the or each bearing block extending between said ribs.

6. A wing according to claim 5, wherein each rib comprises a recess or seat to receive a respective end wall of the bearing block extending between the ribs.

7. A wing according to claim 6, wherein the recess or seat in each rib is shaped to allow rotation of the bearing block about a central axis of said bearing block within said recess or seat.

8. A wing according to claim 6, wherein the recess or seat extends to an edge of each rib to enable insertion of the bearing block into the seat or recess between said ribs in a direction perpendicular to the plane of each ribs.

9. A bearing block to support and guide movement of a slat support arm forming part of a slat support assembly in which the slat support arm is movable to deploy a slat attached to one end of said slat support arm from a leading edge of an aircraft wing, the bearing block comprising a plurality of bearings mountable therein so as to lie in rolling contact with an associated bearing track on a slat support arm extending through the bearing block, wherein each bearing comprises a bearing element rotatable about a shaft fixed to the bearing block, each bearing being configured so that an axis of rotation of each bearing element angularly adjusts, relative to an axis of the shaft on which it is rotatably mounted, to compensate for misalignment between said shaft and an associated bearing track, a pair of spaced end walls, the bearing block being configured so that, when it is received between spaced ribs forming a structural part of an aircraft wing, an end wall is positioned so that it faces a surface of a respective rib, each end wall having an arcuately shaped shoulder for cooperation with a corresponding engagement surface on said rib such that the bearing block is rotatable about a central axis extending through the bearing block perpendicular to the ribs, with the arcuately shaped shoulder sliding against said corresponding engagement surface.

10. A bearing block to support and guide movement of a slat support arm forming part of a slat support assembly in which the slat support arm is movable to deploy a slat attached to one end of said slat support arm from a leading edge of an aircraft wing, the bearing block comprising a plurality of bearings mountable therein so as to lie in rolling contact with an associated bearing track on a slat support arm extending through the bearing block, wherein each bearing comprises a bearing element rotatable about a shaft fixed to the bearing block, each bearing being configured so that an axis of rotation of each bearing element angularly adjusts, relative to an axis of the shaft on which it is rotatably mounted, to compensate for misalignment between said shaft and an associated bearing track, an adjustment and clamping member to enable rotation of said bearing block about a central axis and to clamp said bearing block in position after rotation.

11. A bearing block according to claim 10, wherein said adjustment and clamping member comprises a body positionable on a side of a rib opposite to the side facing the bearing block, and legs that extend from the body and pass through arcuately-shaped slots in the rib to locate in holes in the end wall of the bearing block.

12. A bearing block according to claim 11, wherein the legs are slidable within the slots so that the bearing block rotates about said central axis in response to rotation of the body.

13. A bearing block according to claim 12, wherein the body is spaced from said rib by said legs and the legs are slidable in an axial direction into the bearing block, after an angular position has been reached, to clamp the adjustment and clamping member to the rib and prevent further movement of the bearing block.

14. A bearing block according to claim 13, wherein the body comprises cooperating elements for engagement with corresponding cooperating elements on the rib when the body is slid in an axial direction towards the bearing block to prevent further movement of the bearing block.

15. A bearing block according to claim 14, wherein the cooperating elements on the body comprise a serrated or toothed ring which is received within an aperture in the rib when the body is slid in an axial direction, to cooperate with corresponding serrations or teeth around the periphery of said aperture in the rib.

* * * * *